Patented Dec. 29, 1953

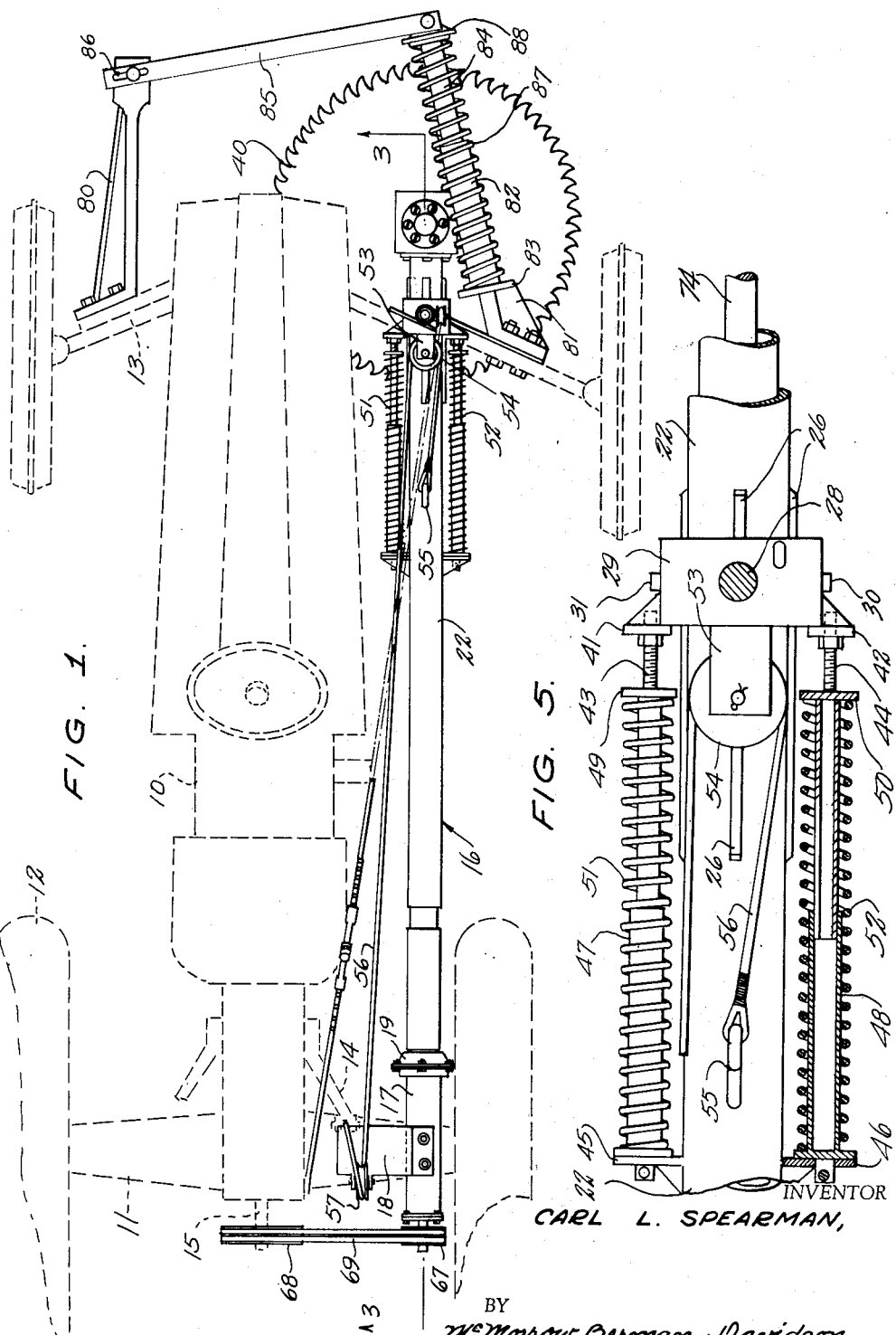

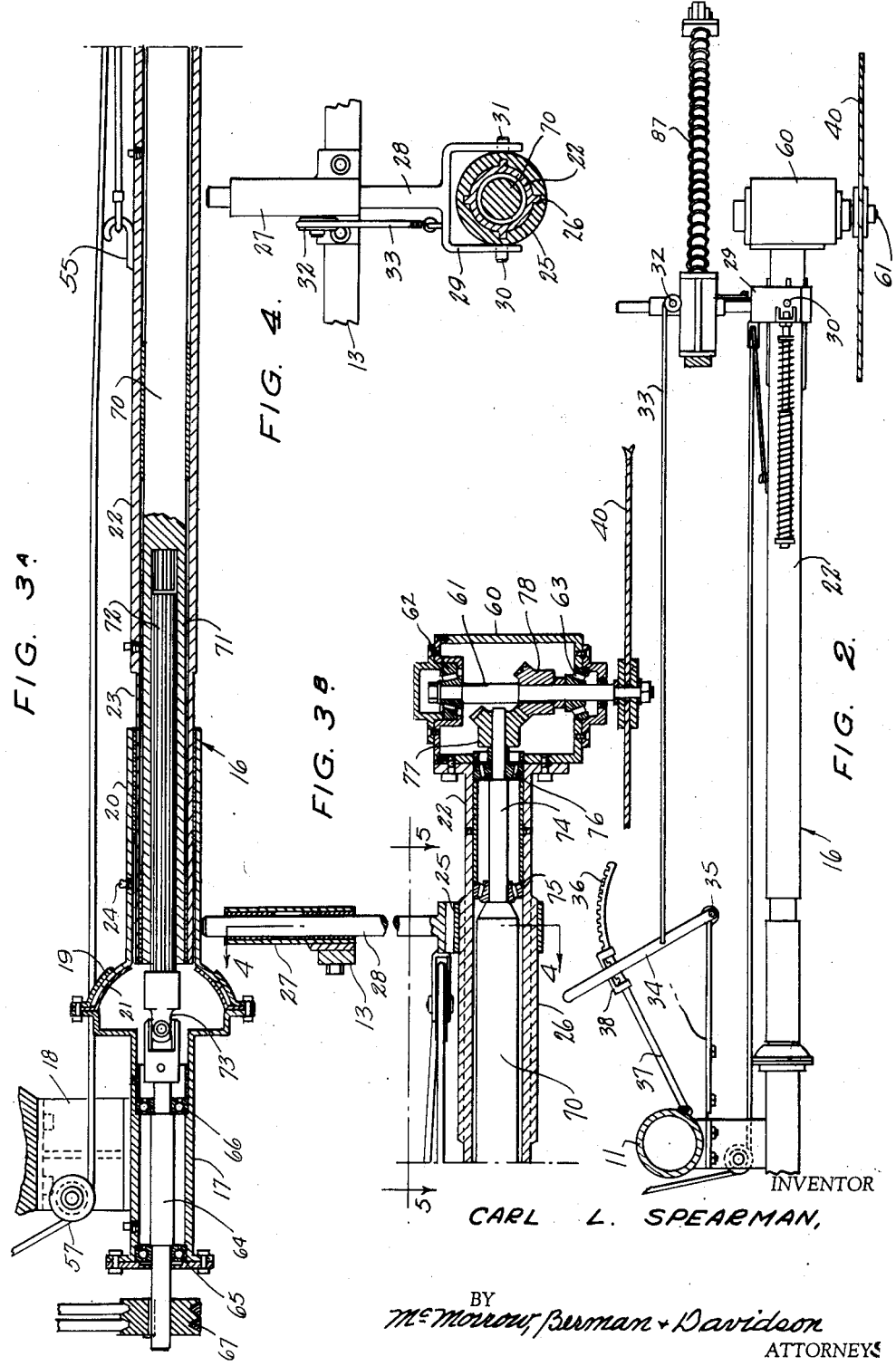

2,664,119

UNITED STATES PATENT OFFICE 2,664,119

BUSH SAW ATTACHMENT FOR TRACTORS

Carl L. Spearman, Westminster, S. C., assignor of one-half to Arthur Brown, Walhalla, S. C.

Application July 6, 1951, Serial No. 235,460

3 Claims. (Cl. 143—43)

This invention relates to bush saw attachments for tractors and more particularly to a bush saw attachment mounted on and driven by a tractor and including a resiliently mounted bumper for controlling the fall of bushes or trees cut by the saw.

It is among the objects of the invention to provide an improved bush saw attachment which can be mounted on a farm tractor with no material modification of the tractor construction and can be used to cut trees as well as bushes and brush; which is adjustable to position the saw at different heights above the ground; which includes a resiliently mounted bumper for forcing trees to fall in a direction away from the supporting tractor and means resiliently retracting the saw behind the bumper when the saw is not in use; in which the moving parts, except the saw, are enclosed to avoid damage to the parts or injury to an operator; and which is simple and durable in construction, economical to manufacture and install, and positive and effective in operation.

Other objects and advantages will become apparent from a consideration of the following description and the appended claims in conjunction with the accompanying drawings wherein:

Figure 1 is a top plan view of a tractor with a bush saw attachment illustrative of the invention operatively mounted on the tractor;

Figure 2 is a side elevation of the attachment with parts of the tractor in section.

Figures 3a and 3b together constitute a longitudinal cross sectional view of the attachment on the line 3—3 of Figure 1;

Figure 4 is a transverse cross sectional view on the line 4—4 of Figure 3b; and

Figure 5 is a cross sectional view on the line 5—5 of Figure 3b.

With continued reference to the drawings, the tractor illustrated is a farm tractor, such as a "Ford" or "Ferguson" type tractor or any type of farm tractor equipped with a hydraulic pressure system and has a longitudinally extending frame 10, a rear axle 11 supporting the rear end of the frame and mounted on the rear drive wheels 12, a front axle 13 supporting the front end of the frame and extending to opposite sides of the latter, the end portions of this front axle being inclined outwardly and rearwardly relative to the frame, hydraulic lift mechanism 14 mounted on the frame adjacent the rear axle and manually controlled in a manner well known to the art, and a power take off connection 15 at the rear end of the frame.

In the case of a tricycle type tractor in which the front end is supported on a front wheel column rather than a front axle, a tool bar may be mounted transversely on the frame substantially at the location of the front axle illustrated, to carry the attachment.

The attachment of the present invention comprises a tubular structure, generally indicated at 16, extending along one side of the tractor frame and disposed at its rear end below the tractor rear axle 11 and near its front end below the corresponding end portion of the tractor front axle 13. This tubular structure includes a rear portion 17 which is fixed relative to the tractor and rigidly secured to the tractor rear axle by a mounting bracket 18, and a front portion movable relative to the tractor and connected at its rear end to the front end of the fixed portion 17 by a pivotal connection 19 providing a universal joint connection between the fixed and movable portions of the tubular structure.

Referring particularly to Figures 3a and 3b, a sleeve 20 extends forwardly from the movable component 21 of the connection 19 and a tube 22 has an end portion 23 of reduced diameter slidably received in the sleeve 20 for longitudinal movement of the tube 22 relative to the sleeve. A grease fitting 24 is provided in the sleeve for lubricating the connection between the tube 22 and the sleeve.

A collar 25 surrounds the tube 22 near the front end of the tube and is provided with angularly spaced apart, longitudinally extending grooves internally thereof. Keys 26 secured on the tube 22 and extending longitudinally thereof are respectively received in the grooves of the collar 25 so that the tube can slide longitudinally in the collar, but is held against rotation relative to the collar.

A sleeve 27 is secured to the tractor front axle 13 in substantially vertical position and a stem 28 extends slidably through this sleeve and has at its lower end a fork 29 the legs of which are disposed at respectively opposite sides of the collar 25 and connected to the collar by pivot studs 30 and 31. A cable sheave 32 is journaled on an axle carried by the sleeve 27 for rotation about a substantially horizontal axis and a cable 33 is connected at one end to the fork 29 and passes over the sheave 32. At its other end this cable is connected to a hand lever 34 which is pivotally mounted at its lower end on the tractor frame, as is indicated at 35. A toothed quadrant 36 is secured to the rear axle 11 by a link 37 and the lever 34 carries detent mechanism 38 which is movable along the quadrant 36 and releasably engageable with the teeth of the quadrant to hold the lever 34 in selected positions relative to the quadrant. This lever 34 is effective, through the cable 33, to raise and lower the front end of the tubular structure 16 relative to the front axle of the tractor and the stem 28 sliding in the sleeve 27 restricts the movement of the front end of the tubular structure to a substantially vertical direction.

While the front end of the tubular structure can be raised and lowered to adjustably vary the operating level of the saw 40, the tube 22 is held against rotational movements.

Apertured lugs 41 and 42, as is particularly illustrated in Figure 5, are mounted on the fork or yoke 29 one on each leg of the fork and screw threaded shafts 43 and 44 are adjustably secured at their front ends respectively to these lugs and extend from the fork 29 rearwardly along the respectively opposite sides of the tube 22 of the tubular structure 16. Apertured lugs 45 and 46 are secured to the tube 22 at respectively opposite sides of the tube and at a location spaced along the tube rearwardly from the fork 29 and sleeves 47 and 48 are secured at their rear ends to the lugs 45 and 46 respectively and extend forwardly from these lugs slidably receiving the corresponding shafts 43 and 44. Abutment collars 49 and 50 are provided on the shafts 43 and 44 adjacent the lugs 41 and 42 and compression springs 51 and 52 are disposed between the lugs 45 and 46 on the tube 22 and the corresponding abutment collars 49 and 50. These are coiled compression springs and the spring 51 surrounds the sleeve 47 and shaft 43 while the spring 52 surrounds the sleeve 48 and shaft 41.

These springs 51 and 52 resiliently urge the tube 22 rearwardly relative to the fork 29.

An extension 53 projecting rearwardly from the upper part of the fork 29 carries a cable sheave 54 and a hook 55 is secured on the tube 22 at a location spaced rearwardly from the keys 26. A cable 56 is secured at one end to the hook 55 and is carried around the cable sheave 54 from which it extends rearwardly to a cable sheave 57 mounted on the bracket 18. The cable 56 is carried around the cable sheave 57 and connected at its other end to the hydraulic implement lift mechanism 14 of the tractor. When the implement lift mechanism is operated, it acts through the cable 56 to advance the tube 22 through the collar 25 against the force of the compression springs 51 and 52. The tube 22 is thus longitudinally movable as well as vertically movable.

A gear housing 60 is mounted on the front end of the tube 22 and a saw arbor 61 is journaled in this gear housing by antifriction roller bearings 62 and 63 disposed at the top and bottom ends respectively of the housing. The saw 40 is mounted on the arbor 61 at the lower end of the housing 60 for rotation in a substantially horizontal plane.

A shaft 64 is journaled in the fixed portion 17 of the tubular structure by suitable antifriction ball or roller bearings 65 and 66 and projects outwardly of the rear end of the tubular member 17. A belt pulley 67 is mounted on the shaft 64 rearwardly of the tubular portion 17 and a belt pulley 68 is mounted on the tractor power take off connection 15 and connected to the pulley 67 by parallel V-belts 69 so that the power take off connection is drivingly connected to the shaft 64.

A shaft 70 extends through the tube 22 and is provided at its rear end with a longitudinally grooved tubular portion 71. A splined shaft 72 is slidably received in the grooved tubular portion 71 of the shaft 70 and is connected at its rear end to the front end of the shaft 64 by a universal joint 73 which is disposed substantially at the location of the pivotal connection 19 between the fixed portion 17 and the movable portion of the tubular structure 16.

With this arrangement, the shaft 70 can move vertically and longitudinally with the tube 22 without interrupting its driving connection with the shaft 64.

At its front end the shaft 70 has a portion 74 of reduced diameter journaled in the front end portion of the tube 22 by spaced apart antifriction roller bearings 75 and 76 and this reduced end portion of the shaft extends into the gear housing 60 and receives a beveled gear 77 disposed within the gear housing. A beveled gear 78 is mounted on the saw arbor 61 and meshes with the gear 77, so that these beveled gears provide a driving connection between the shaft 70 and the saw arbor 61 and the saw is driven from the power take off connection of the tractor.

An arm 80 is mounted at one end on the front axle 13 at the side of the tractor frame remote from the tubular structure 16 and projects forwardly from the tractor rear axle in a substantially horizontal position. An arm 81 is secured at one end to the front axle 13 at the side of the frame at which the tubular structure is located and also projects forwardly from the front axle in a substantially horizontal position. This arm 81 includes a tubular portion 82 extending from a location adjacent the tractor front axle to the distal end of the arm and an abutment collar 83 at the proximal end of the tubular portion 82. A rod 84 is slidably received in the tubular portion 82 of the arm 81 and a bumper bar 85 is pivotally connected at one end to the forward end of the rod 84 and is pivotally connected at its other end to the forward end of the arm 80, a slot 86 being provided in the bar extending longitudinally thereof to provide a lost motion connection between this end of the bar and the front end of the arm 80. A coiled compression spring 87 surrounds the tubular portion 82 and the rod 84 between the abutment 83 and an abutment 88 secured on the rod 84 adjacent the bumper bar 85 to resiliently hold the bumper bar in a position spaced outwardly from the distal end of the tubular portion 82.

When the implement lift mechanism 14 of the tractor is not actuated, the saw 40 is held by the springs 51 and 52 in retracted position rearwardly of the bumper bar 85, as is particularly illustrated in Figure 1. When it is desired to use the device to saw down a tree, the tractor is driven up to the tree in position such that the center of the saw is disposed slightly to the right of the tree as viewed from the tractor seat, and the bumper bar 85 is pushed against the tree. The tractor is moved forwardly until the front edge of the saw contacts the tree, the compression spring 87 being then compressed and the tractor brakes are then set so that the spring 87 will exert pressure against the tree at a location spaced above the saw 40. The saw may then be adjusted by the hand lever 34 to the desired cutting elevation and the tractor power take off connection 15 placed in operation to drive the saw. The tractor implement lift mechanism 14 is then placed in operation to force the saw forwardly and into the tree against the force of the compression springs 51 and 52 until the tree is cut off near the ground. The pressure of the bumper bar 85 against the tree will prevent the tree from pinching the saw while the tree is being cut and will force the tree to fall in a direction away from the tractor.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. The combination with a tractor having a frame, a rear axle supporting the rear end of said frame, a front axle supporting the front end of said frame, a power take off connection at the rear end of said frame, and an implement lift mechanism carried by said frame adjacent said rear axle, of a brush saw mechanism comprising a variable length tubular structure extending along one side of said frame below said axles and including a rear portion fixed to said rear axle and a front portion movable relative to said rear portion and pivotally connected at its rear end to the front end of said rear portion, manually operable means connected between said front portion near the front end of the latter and said front axle for raising and lowering the front end of said front portion, means connected between said front portion and said front axle providing freedom of vertical and longitudinal movement of said front portion relative to said front axle while restraining said front portion against rotational movement, a gear housing mounted on the front end of said front portion and having a lower end, a saw arbor journaled in said gear housing and projecting from the lower end of the latter, a circular saw secured to said saw arbor at the lower end of said housing for rotation in a substantially horizontal plane, a variable length drive shaft extending through said tubular structure and having a universal joint connection therein, means drivingly connecting said power take off connection to said drive shaft at the rear end of said tubular structure, gear means in said housing drivingly connecting said drive shaft to said saw arbor, spring means acting between said frame and the front portion of said tubular structure resiliently urging said saw rearwardly relative to the tractor, and means connected between said front portion, said frame and said implement lift mechanism operative to advance said saw forwardly against the force of said spring means when said implement lift mechanism is operated.

2. A bush saw attachment for an agricultural tractor having front and rear axles, a power take off connection on said rear axle and an implement lift arm adjacent said rear axle comprising an elongated tubular structure adapted to extend longitudinally of the associated tractor below the tractor axles and including a rear portion adapted to be rigidly secured to the associated tractor rear axle and a front portion pivotally connected at its rear end to the front end of said rear portion and adapted to extend from the front end of said rear portion forwardly of the associated tractor front axle, a gear housing mounted on the front end of said front portion, a saw arbor journaled in said housing, a saw mounted on said arbor outside of said housing, a drive shaft extending through said tubular structure and having a universal joint connection therein at the location of the pivotal connection between the rear and front portions of said tubular structure, gear means in said housing drivingly connecting said drive shaft to said saw arbor, means on said drive shaft at the rear end of the rear portion of said tubular structure for drivingly connecting an associated tractor power take off connection to said drive shaft, a sleeve adapted to be mounted in vertical position on an associated tractor front axle, a stem slidably received in said sleeve and having a fork at its lower end, a collar pivotally mounted in said fork and slidably receiving the front portion of said tubular structure, and manually operated means connected between said sleeve and said fork for raising and lowering the front end of said tubular structure and said saw.

3. A bush saw attachment for an agricultural tractor having front and rear axles, a power take off connection on said rear axle and an implement lift arm adjacent said rear axle comprising an elongated tubular structure adapted to extend longitudinally of the associated tractor below the tractor axles and including a rear portion adapted to be rigidly secured to the associated tractor rear axle and a front portion pivotally connected at its rear end to the front end of said rear portion and adapted to extend from the front end of said rear portion forwardly of the associated tractor front axle, a gear housing mounted on the front end of said front portion, a saw arbor journaled in said housing, a saw mounted on said arbor outside of said housing, a drive shaft extending through said tubular structure and having a universal joint connection therein at the location of the pivotal connection between the rear and front portions of said tubular structure, gear means in said housing drivingly connecting said drive shaft to said saw arbor, means on said shaft at the rear end of the rear portion of said tubular structure for drivingly connecting an associated tractor power take off connection to said drive shaft, a sleeve adapted to be mounted in vertical position on an associated tractor front axle, a stem slidably received in said sleeve and having a fork at its lower end, a collar pivotally mounted in said fork and slidably receiving the front portion of said tubular structure, manually operated means connected between said sleeve and said fork for raising and lowering the front end of said tubular structure and said saw, the front portion of said tubular structure including longitudinally aligned parts longitudinally slidable relative to each other and the portion of said drive shaft within the front portion of said tubular structure including drivingly connected parts longitudinally slidable relative to each other, spring means connected between said yoke and the portion of said tubular structure received in said collar resiliently urging said housing and said saw toward the rear portion of said tubular structure and rearwardly relative to an associated tractor front axle, and tension means connected to the front portion of said tubular structure and to said yoke and adapted to be connected to an associated tractor implement lift arm to move said housing and said saw in a direction away from the rear portion of said tubular structure and forwardly relative to an associated tractor front axle.

CARL L. SPEARMAN.

References Cited in the file of this patent
UNITED STATES PATENTS

| Number | Name | Date |
|---|---|---|
| 827,548 | Martin | July 31, 1906 |
| 1,414,319 | Zaiauskis | Apr. 25, 1922 |
| 2,462,314 | Fuqua | Feb. 22, 1949 |
| 2,575,696 | Way | Nov. 20, 1951 |